Sept. 30, 1969 R. HARTMANN 3,470,284
DEVICE FOR PRODUCING REFRACTORY BODIES
AND A METHOD OF PRODUCING SUCH BODIES
Filed March 16, 1966 3 Sheets-Sheet 1

Inventor:
Rolf Hartmann
BY Hane and Nydick
Attorneys

Sept. 30, 1969  R. HARTMANN  3,470,284
DEVICE FOR PRODUCING REFRACTORY BODIES
AND A METHOD OF PRODUCING SUCH BODIES
Filed March 16, 1966  3 Sheets-Sheet 2

Inventor:
Rolf Hartmann
By Hame and Rydick
Attorneys

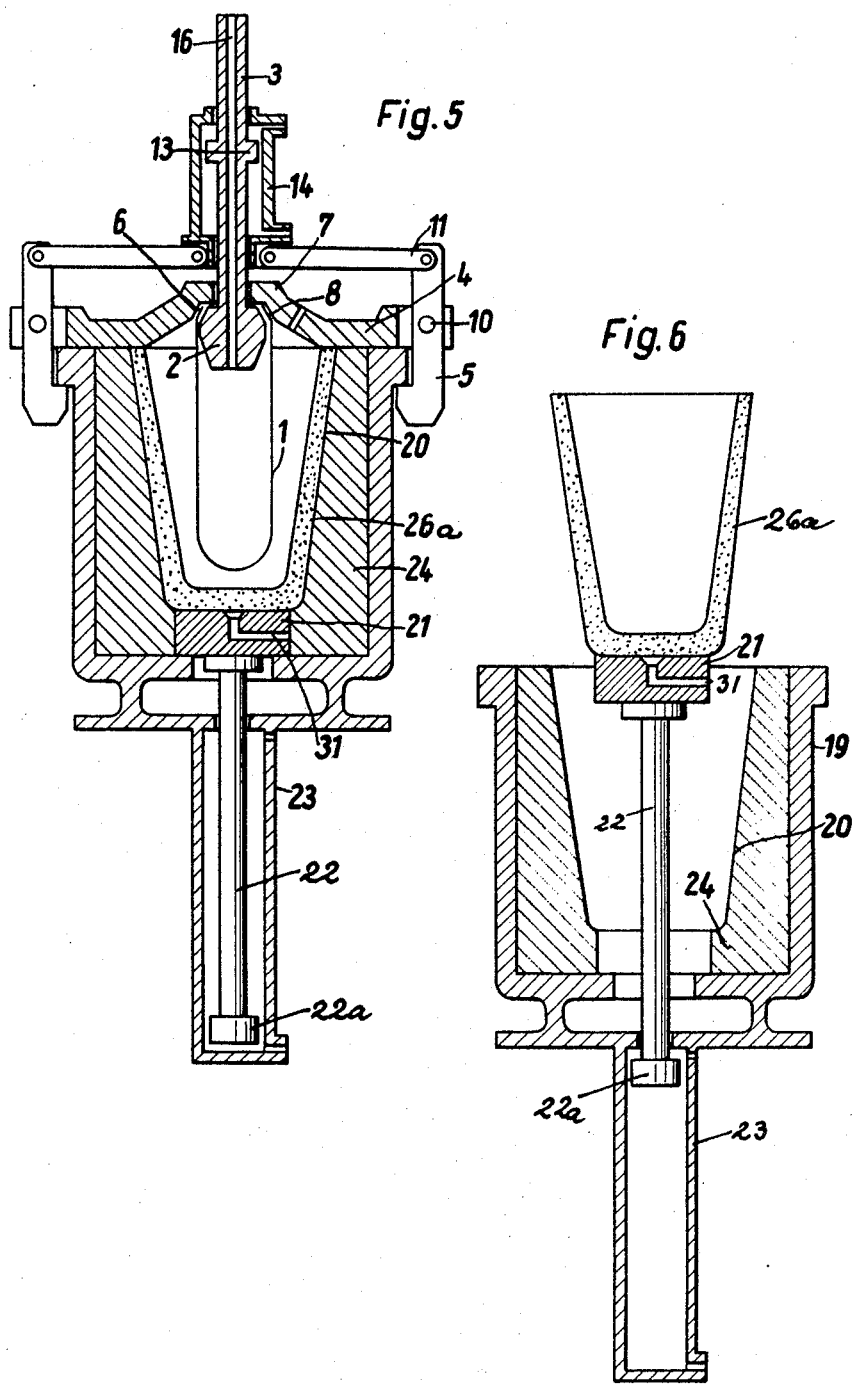

United States Patent Office 3,470,284
Patented Sept. 30, 1969

3,470,284
DEVICE FOR PRODUCING REFRACTORY BODIES
AND A METHOD OF PRODUCING SUCH BODIES
Rolf Hartmann, Hofheim, Taunus, Germany, assignor to
Aug. Gundlach G.m.b.H., Grossalmerode, Germany, a
company of Germany
Filed Mar. 16, 1966, Ser. No. 534,755
Claims priority, application Germany, May 14, 1965,
G 43,594
Int. Cl. B28b 7/32; B29c 1/12
U.S. Cl. 264—119                               12 Claims

ABSTRACT OF THE DISCLOSURE

A method and device for producing hollow refractory bodies by first inserting into a mold having a cavity the walls of which define the outer configuration of a body, a rigid pre-form core so that a space is left surrounding the core. This space is packed with a granulated moldable material whereupon the core is withdrawn. An expandable finishing core is then inserted into the space and expanded, by application of pressure, to a shape which causes compaction of the material in the space to a shape representing the desired final form of the hollow body.

The present invention relates to a device for producing shaped hollow refractory bodies and to a method of producing such bodies.

It is known to produce shaped hollow refractory bodies, particularly crucibles, by manually stacking discs of a clay-graphite mixture upon a turntable. The stack thus formed, is then turned to give it a pre-form shape. Thereupon a suitably shaped plate is fitted upon the preform body and rotated thereby producing the desired final external configuration of the crucible or other body to be produced. Finally, the interior of the crucible is shaped by means of a suitable template.

As is evident, the aforedescribed method of producing crucibles and other shaped hollow refractory bodies requires a considerable amount of expensive skilled labor. Moreover, it is very difficult, if not impossible, to obtain uniform wall thicknesses and density of the crucibles. Uniformity of the wall thickness and the density thereof is particularly important for ceramic crucibles since lack of uniformity tends to cause internal stresses in the crucible which, in turn, may be a cause of a premature failure of the crucible.

It is an object of the invention to provide a novel and improved method of producing refractory shaped hollow bodies, in particular, crucibles which have a substantially uniform wall thickness and density.

It is also an object of the invention to provide a novel and improved device for carrying out the method according to the invention with which device shaped hollow refractory bodies with substantially uniform wall thickness and density can be formed in a simple, reliable and inexpensive manner.

The aforementioned objects, features and advantages and other objects, features and advantages which will be pointed out hereinafter are attained by means of a device comprising a mold the cavity of which defines the external configuration of the hollow refractory body to be produced. A rigid pre-form core is insertable into the mold cavity to define therein a space between the cavity wall and the core wall whereby upon filling this space with a preferably granulated refractory material, the final outer shape of the body is obtained. The rigid core is thereupon withdrawn and an expandible and flexible finishing core is inserted into the space vacated in the refractory material by withdrawal of the rigid core therefrom. The flexible core is now expanded whereby the material in the aforesaid space is pressed toward the cavity wall and thus densified. Moreover, the inner wall of the space into which the expandible core is inserted, is shaped in conformity with the outer surface of the expandible core in its expanded condition. Finally, the expandible core is deflated and withdrawn from the mold. The shaping of the refractory body is now completed and the same can be withdrawn from the mold for further treatment.

The finishing core is expanded by feeding a suitable pressure medium into the interior of the core and deflated by withdrawing the pressure medium therefrom. According to a feature of the invention, the expandible core may be an inflatable elastic member such as a rubber balloon which is inflated by filling the same with a suitable fluid such as oil, preferably at a pressure of at least 50 atmospheres. The required pressure may be produced by means of a hydraulic pump. As is well known, pressure in a fluid is propagated uniformly. Accordingly, the pressure upon the wall of the granulated refractory material from which the crucible is formed, is also uniform so that the crucible will obtain a substantial uniform wall thickness and density. As pointed out before, the useful life and the quality of a crucible or other shaped hollow body, are considerably increased by a uniform wall thickness and density.

It is known from German Patent 57,458 to produce hollow building blocks by means of an elastic pressure core which is inserted into a mold cavity, the remaining space in which is then filled with clay or a similar material. However, an arrangement of this kind is not suitable to produce a shaped hollow body with uniform wall thickness and density.

The invention further provides to combine the expandible finishing core with a cover for the mold cavity as a structural unit. This has the advantage that the expandible core and the cover can be simultaneously inserted into the mold from the top thereof.

The cover is preferably provided with clamping levers or arms which are operated by suitable pressure means such as hydraulic or pneumatic pressure means to effect clamping of the cover and with it, of the expandible core to the mold proper. To operate the clamping levers or arms and also to fill the expandible core with pressure fluid or to discharge the pressure fluid therefrom, a rod mounting a piston is centrically secured to the cover extending normal thereto. The piston is fitted in a cylinder which is lengthwise slidable in reference to the piston rod and to which the clamping levers or arms are linked.

The piston rod has preferably an axial bore for feeding the pressure fluid into the expandible core and discharging the pressure fluid therefrom to collapse the core. The clamping levers or arms are pivoted into and out of a clamping position by feeding pressure fluid into the cylinder to effect displacement thereof in reference to the piston rod. The same pressure fluid and the same means for applying pressure to the same, may be used for activating both the expandible core and the clamping levers or arms.

According to a further feature of the invention, the piston rod terminates in an enlarged generally spherical head which is fitted with tension into the open end of a rubber balloon used as an expandible core. The end of the balloon can then conventiently be clamped between the head and a cover wall portion by providing a suitably shaped annular gap between the head or the respective portion of the piston rod and the cover wall.

Another feature of the invention is to provide a bottom portion of the cavity wall as a separate structural unit which is displaceable in the direction of the general center axis of the mold cavity. This has the advantage that the movable wall portion can be used in the manner of a table for lifting a fully shaped hollow body by either displacing the movable wall portion manually or by hydraulic or pneumatic means.

In the accompanying drawing, a preferred embodiment of the invention is shown by way of illustration and not by way of limitation.

In the drawing:

FIG. 5 is a sectional view similar to FIG. 4, but showing the expandible core after deflation upon completion of the forming operation, and FIG. 6 is a sectional view showing the mold after removal of the core-cover assembly and lifting of the finished shaped hollow body.

Figure 1:
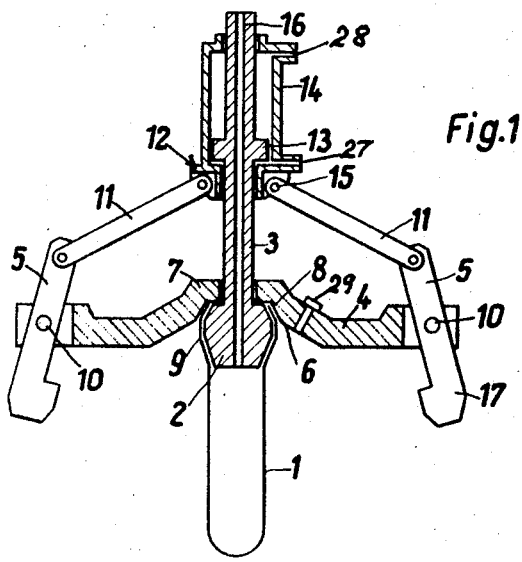
FIG. 1 is an elevational view, partly in section, of the core-cover assembly of the device.

Referring now to the figures more in detail and particularly to FIG. 1, the core-cover assembly as shown in this figure comprises an expandible hollow finishing core 1 such as a rubber balloon open at its end 9. The open end of the core is pulled with tension upon an enlarged generally spherical head 2 formed at one end of a piston rod 3 mounting a piston 13 which may be integral with the rod. Rod 3 extends through an opening of a cover plate 4. The opening is formed in the preferably flanged center portion 7 of plate 4 and has a conical wall portion 6 to define an annular narrow gap 8 in which the end portion 9 of core 1 is clamped.

Several clamping levers 5 are linked to the rim of cover plate 4 by means of pivot pins 10. The levers terminate at one end in a hook 17 and are linked at the other end to links 11 which, in turn, are hinged at 15 to a cylinder 14 of an actuating assembly 12. The cylinder is slidable in reference to piston 13 which, as evident, is stationary relative to cover plate 4. Accordingly, displacement of the cylinder 14 causes a corresponding pivotal movement of levers 5 which is used to clamp the core-cover assembly to a mold box 19 by engagement of hooks 17 with a peripheral collar 18 of the box. Displacement of cylinder 14 is effected by feeding pressure fluid into the cylinder either through duct 27 or duct 28 depending upon the desired direction of displacement of the cylinder.

Piston rod 3 is formed with an axial bore 16 extending throughout the entire length of the rod for feeding pressure fluid into core 1 or discharging such pressure fluid from the core.

Figure 2:
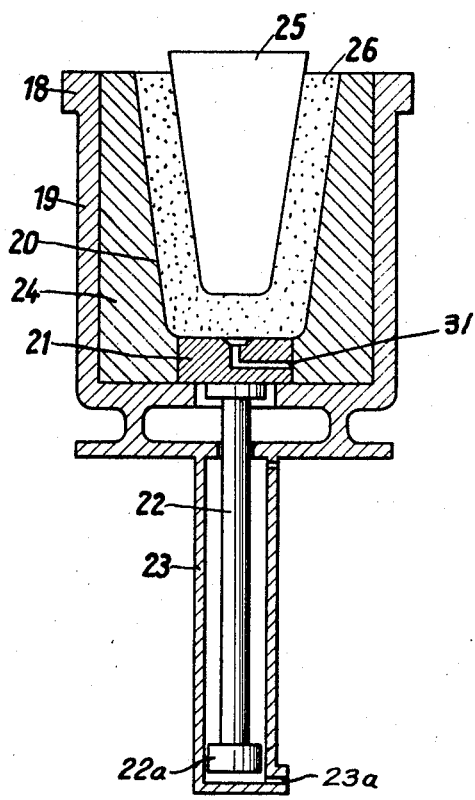
FIG. 2 is an elevational sectional view of the mold assembly and a view of a pre-form core both constituting part of the device according to the invention.

The mold assembly as shown in FIG. 2, comprises the mold box 19 with its collar 18. A mold 24 is exchangeably fitted in the mold box, the inner wall 20 of the mold defining the outer configuration of a crucible or other shaped hollow body to be formed. As is readily apparent, differently shaped crucibles or other bodies may be formed by suitably selecting the shape of mold 24.

The bottom wall of mold 24 is formed by a separate wall portion 21 which can be lifted from the position of FIG. 2 into an elevated position such as is shown in FIG. 6. Lifting or lowering of wall portion 21 can be effected by suitable lifting means such as hydraulic means. There is shown a rod 22, supporting wall portion 21 and piston 22a, the latter being slidable in a cylinder 23. As is evident, feeding of pressure fluid into cylinder 23 through a duct 23a will cause lifting of wall portion 21. Wall portion 21 constitutes in effect a table for conveniently removing a fully shaped hollow body from the mold. To facilitate separation of the shaped body from table 21, pressurized air may be forced through a duct 31 between the top wall of the table and the bottom wall of the shaped body resting thereon.

To produce a crucible or other shaped body with the device of the invention a rigid pre-form core 25 is inserted into the mold cavity defined by mold 24. The configuration of core 25 is selected in accordance with the general shape desired for the crucible or other hollow body to be formed.

The space defined by core 25 in the mold cavity between core 25 and wall 20 of mold is then packed with a suitable refractory material 26, preferably in granulated form such as clay-graphite mixture.

Pre-form core 25 is thereupon removed and the core-cover assembly is fitted upon the mold box so that finishing core 1 extends into the space 30 vacated by core 25. The core-cover assembly is now clamped upon the mold assembly as has been described in connection with FIG. 1. Accordingly, all the elements of the device are now in the position shown in FIG. 3.

Finishing core 1 is now inflated by feeding pressurized fluid, such as oil, into the core through bore 16. It has been found that a pressure of about 100 atmospheres is generally most advantageous, but in some instances, a pressure of 50 atmospheres and even less, may be sufficient. As a result of the pressure build-up in core 1, the same is gradually expanded from the deflated condition of FIG. 3 to the inflated condition of FIG. 4. The air present in space 30 (see FIG. 3) may be discharged through a valve 29 during the inflation of core 1. As is evident, the gradual, continuing and uniform expansion of core 1 causes a corresponding compression of the granulated refractory material in space 30 until the material is compressed to the shape 26a shown in FIG. 4 which represents the shape of the crucible to be formed.

Figure 3:
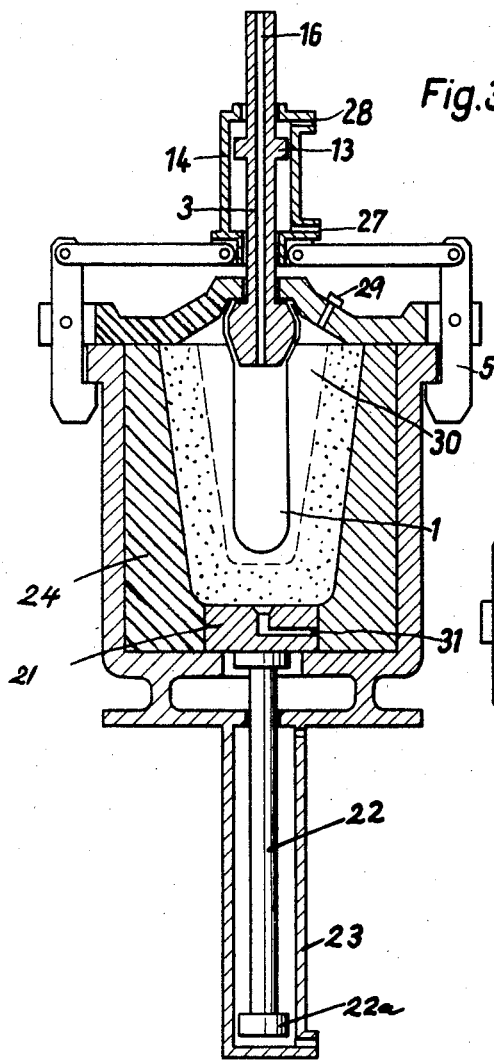
FIG. 3 is a sectional view of the core-cover assembly clamped to the mold of FIG. 2, the expandible core being shown in its deflated or relaxed condition.
Figure 4:
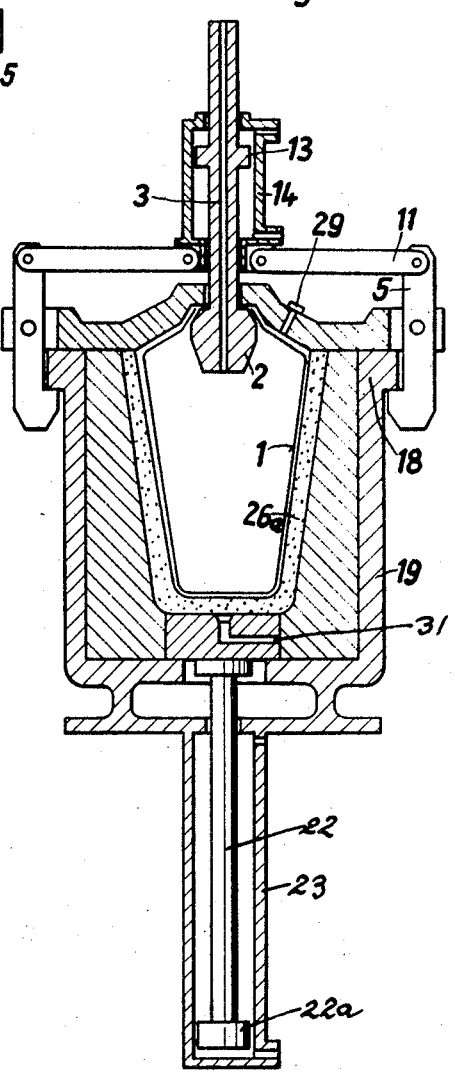
FIG. 4 is a sectional view similar to FIG. 3, but showing the expandible core in its expanded condition.

Finishing core 1 is now deflated by discharging the oil therein through bore 16 and accordingly, the core returns more or less into its initial condition as shown in FIG. 3. In actual practice, it may remain slightly expanded as it is indicated in FIG. 5, depending upon the type of the material used for the core.

The core-cover assembly is now released by pivoting the clamping levers 5 outwardly as previously described and is removed from the mold assembly by lifting it upwardly.

Finally, the fully shaped crucible 26a is removed from the mold assembly by moving table 21 upwardly as previously described (see FIG. 6). In the event the crucible should adhere somewhat to table 21, it can be safely and conveniently loosened by blast of a pressurized medium such as a air through a duct 31.

What is claimed is:

1. A method of forming a hollow refractory body of predetermined shape and wall thickness, said method comprising the steps of:
   providing a mold open at the top and including a mold cavity having walls defining the outer configuration of the hollow body to be formed;
   inserting into the mold cavity a rigid preform core defining therein a space surrounding the core;
   packing said space with a mixture of a granulated moldable refractory material;
   withdrawing said rigid core from the mixture to vacate a central space therein;
   inserting into the space vacated by the rigid core and freely fitting the same a finishing core elastically expandable from an initial shape fitting said space to a final shape corresponding to the desired inner configuration of the hollow body; and
   expanding said finishing core to said final shape thereby compacting the mixture in said space between the inner wall of the mold cavity and the outer wall of the finishing core to the predetermined shape and wall thickness of the hollow body.

2. The method according to claim 1, wherein said expandible finishing core is a closed hollow body made of an elastic material, and wherein said core body is expanded by feeding pressure fluid into the same.

3. The method according to claim 2, wherein the pressure fluid is fed into the core body until the pressure therein is between 50 and 150 atmospheres.

4. The method according to claim 3, wherein the pressure fluid is fed into the core body until the pressure therein is about 100 atmospheres.

5. The method according to claim 1 and comprising the step of closing said mold cavity simultaneously with the insertion of the expandible finishing core into the space vacated by the rigid pre-form core.

6. The method according to claim 1 wherein said space is packed with a granulated moldable mixture of clay and graphite.

7. A mold assembly for forming a hollow refractory body of pre-determined shape and wall thickness, said mold assembly comprising in combination:
  (a) a mold having an open top and including a mold cavity having walls defining the outer configuration of the hollow body to be formed;
  (b) a rigid pre-form core insertable into and withdrawable from said mold cavity, said core when inserted into the mold cavity defining therein a space surrounding the core and adapted for packing with a moldable granulated refractory material;
  (c) a finishing core insertable into the space vacated within the material upon withdrawal of said rigid core therefrom, said finishing core being elastically expandable from an initial shape freely fitting said space to a final shape corresponding to the desired inner configuration of the hollow body;
  (d) mold closure means secured to said finishing core for simultaneously inserting said core into said mold cavity and closing the same, said closure means comprising a cover, clamping means supported by said cover pivotally between a clamping position gripping said mold in clamping engagement and a release position disengaged from the mold, and actuating means including a pressure cylinder pivotally supporting the clamping means, a piston, a hollow piston rod mounting said piston and being secured to said cover extending therethrough, said rod supporting said finishing core, and said piston being slidable in said cylinder, and means for feeding pressure fluid into said cylinder to displace the piston therein for pivoting the clamping means from one of said positions into the other;
  (e) pressure means for expanding said finishing core to said final shape for compacting the material in said space between the inner wall of the mold cavity and the outer wall of the finishing core to the predetermined shape and wall thickness of the hollow body.

8. The mold assembly according to claim 7, wherein said elastically expandable finishing core is a hollow inflatable member made of elastic material and open at one end.

9. The mold assembly according to claim 8, wherein said piston rod has an axial bore communicating with said inflatable member for filling the same with pressure fluid through the open end thereof and discharging the pressure fluid therefrom through the hollow piston rod.

10. The mold assembly according to claim 9, wherein said piston rod terminates at one end in an enlarged head for fitting thereupon the open end of the inflatable member and is extended through said cover with play to define an annular space between the rod and the adjacent wall portion of the cover, said annular space constituting a clamping slot for engaging the open end portion of the inflatable member with a clamping fit between the rod and the cover.

11. The mold assembly to claim 7, wherein a bottom portion of the mold wall defining the wall cavity is movably mounted and displaceable in the direction of insertion and withdrawal of said rigid core from the mold cavity, said movable wall portion constituting a support for a hollow body formed in the mold cavity.

12. The mold assembly according to claim 11, and comprising power drive means coacting with said movable wall portion for lifting the same together with a finished hollow body supported thereon.

References Cited
UNITED STATES PATENTS

| | | | |
|---|---|---|---|
| 162,911 | 4/1875 | Galloway | 264—294 |
| 1,884,529 | 10/1932 | Benner et al. | 264—109 |
| 2,363,107 | 11/1944 | Young | 264—314 |
| 2,999,272 | 9/1961 | Warnken. | |

ROBERT F. WHITE, Primary Examiner

J. R. HALL, Assistant Examiner

U.S. Cl. X.R.

18—5, 43, 45; 264—120, 294, 314